United States Patent
Chun

(10) Patent No.: US 9,975,520 B1
(45) Date of Patent: May 22, 2018

(54) METHOD AND SYSTEM FOR CONTROLLING CAR SERVICE

(71) Applicants: Hyundai Motor Company, Seoul (KR); Kia Motors Corporation, Seoul (KR)

(72) Inventor: In Sik Chun, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days. days.

(21) Appl. No.: 15/640,030

(22) Filed: Jun. 30, 2017

(30) Foreign Application Priority Data

Nov. 23, 2016 (KR) .................... 10-2016-0156507

(51) Int. Cl.
| | | |
|---|---|---|
| *G08G 1/01* | (2006.01) | |
| *B60R 25/20* | (2013.01) | |
| *H04W 4/04* | (2009.01) | |
| *G07C 9/00* | (2006.01) | |
| *G08B 25/10* | (2006.01) | |
| *B60R 25/32* | (2013.01) | |
| *B60R 25/33* | (2013.01) | |
| *F16H 63/40* | (2006.01) | |

(52) U.S. Cl.
CPC ...... *B60R 25/2036* (2013.01); *B60R 25/2018* (2013.01); *B60R 25/32* (2013.01); *B60R 25/33* (2013.01); *G07C 9/00* (2013.01); *G08B 25/10* (2013.01); *H04W 4/046* (2013.01); *B60R 2325/205* (2013.01); *F16H 63/40* (2013.01)

(58) Field of Classification Search
CPC .......................... B60R 25/2036; B60R 25/102
USPC .......... 340/933, 426.1, 438, 439, 988, 995.1
See application file for complete search history.

(56) References Cited

U.S. PATENT DOCUMENTS

| | | | | |
|---|---|---|---|---|
| 2003/0033175 | A1* | 2/2003 | Ogura | .................... G06Q 10/02 705/5 |
| 2014/0257873 | A1* | 9/2014 | Hayward | ................. G07C 5/00 705/4 |
| 2015/0022338 | A1* | 1/2015 | Hwang | .................. G08B 25/10 340/501 |

FOREIGN PATENT DOCUMENTS

| | | |
|---|---|---|
| JP | 2007-036720 | 2/2007 |
| KR | 10-2010-0118875 | 11/2010 |
| KR | 10-2014-0073672 | 6/2014 |
| KR | 10-2015-0063834 | 6/2015 |
| KR | 10-2016-0101123 A | 8/2016 |

\* cited by examiner

*Primary Examiner* — Tai T Nguyen
(74) *Attorney, Agent, or Firm* — Morgan, Lewis & Bockius LLP

(57) ABSTRACT

Disclosed are a method and a system for controlling a vehicle service, which are designed to simply set or unset a service even when a service license-authorized vehicle is halted and then a driver and/or occupants are changed, whereby the service licensee can promptly take necessary measures without trouble in response to a changing situation.

11 Claims, 2 Drawing Sheets

METHOD AND SYSTEM FOR CONTROLLING CAR SERVICE

CROSS REFERENCE TO RELATED APPLICATION

The present application claims priority to Korean Patent Application No. 10-2016-0156507, filed Nov. 23, 2016, the entire contents of which is incorporated herein for all purposes by this reference.

BACKGROUND OF THE INVENTION

Field of the Invention

The present invention relates to a method and a system for controlling a car service. More particularly, the present invention relates to a method and a system for controlling a car service by which not only can a pre-existing service be maintained even when a service licensee merely indicates his or her intention to continue to use the service in order for a non-licensee to drive the car after the licensee gets out of the car, but the licensee can also be informed of events that occurred while the service licensee was not driving the car.

Description of Related Art

In recent years, various services based on car GPS information, such as route finding, call taxi services, and location-based advertising, have been proposed.

Representative among them is a geo-fence service. The term "geo-fence," derived from a combination of "geographic" and "fence", refers to a virtual perimeter for a real-world geographic area. Given a geo-fence, a user of the system can be identified as entering or exiting the area set by the geo-fence.

Geo-fencing finds applications in many fields. For example, geofencing is critical to telematics. If a car owner who subscribes to a telematics service establishes an area in which the car is allowed to run or prohibited from running, a warning message is sent to a mobile device of the car owner when the car exits the allowed area or enters the prohibited area, based on GPS information on the car.

There are problems in the application of geofencing to telematics. Assume that both a licensee and a non-licensee of a geofence together take control of and operate a car. Then, when the non-licensee drives the car after the licensee gets out of the car, it is difficult to reset the geofence.

In addition, a car owner is not directly made aware of events that have occurred in the car when the car owner was not running the car.

Accordingly, there is a need for a solution by which not only can a pre-existing service be maintained even when a service licensee merely indicates his or her intention to continue to use the service in order for a non-licensee to drive the car after the licensee gets out of the car, but the licensee can also be informed of events that occurred while the service licensee was not driving the car.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system for controlling a car service, by which not only can a pre-existing service be maintained even when a service licensee merely indicates his or her intention to continue to use the service in order that a non-licensee drives the car after the licensee gets out of the car, but the licensee can also be informed of events that occurred while the service licensee was not driving the car.

In order to accomplish the object, various aspects of the present invention provide a method for controlling a car service, including: searching for a license-authorized terminal among terminals located in a car; starting the car service if no license-authorized terminals are detected; checking whether or not the car is halted and whether or not a car door is opened and subsequently closed; searching again for the license-authorized terminal among terminals located in the car if the car door is opened and subsequently closed; and maintaining the car service if no license-authorized terminals are detected.

In one embodiment, an examination is made to see whether or not the car is granted a service license in the step of searching for the license-authorized terminal among the terminals located in the car.

In another exemplary embodiment, the license-authorized terminal is detected by comparing the terminals located in the car with a list provided for the car in the step of searching for the license-authorized terminal among the terminals located in the car.

In another exemplary embodiment, the step of starting the car service is conducted if an intention of a licensee to use the car service is ascertained through the license-authorized terminal after the license-authorized terminal is detected.

In another exemplary embodiment, the step of starting the car service is conducted if an intention of a licensee to use the car service is ascertained through an interface of the car after the license-authorized terminal is detected.

In another exemplary embodiment, the step of checking whether or not the car is halted is carried out by determining whether or not a gear lever is in a P or N position while the car is moving at a speed of 0 km.

In another exemplary embodiment, the method further includes stopping the car service when the license-authorized terminal is detected after the step of searching for the license-authorized terminal among terminals located in the car if the car is halted and the car door is opened or closed.

In another exemplary embodiment, the step of stopping the car service is carried out if an intention of a licensee to stop the service is ascertained after the license-authorized terminal is detected.

In another exemplary embodiment, the car service provides an alarm when the car escapes from a pre-established permitted area or enters a pre-established prohibited area.

In another exemplary embodiment, the car service sends an alarm to the license-authorized terminal when the car runs exceeding a preset speed.

Also, various aspects of the present invention provide a method for controlling a car service, including: using a communication device of a car to search for a license-authorized terminal among terminals located in the car; starting the car service when no license-authorized terminals are detected by the communication device; checking in a control device of the car whether or not the car is halted and whether or not a car door is opened and subsequently closed; searching again in the communication unit for the license-authorized terminal among terminals located in the car if the car door is opened and subsequently closed; and operating the control device or an external server to maintain the car service when no license-authorized terminals are detected by the communication device.

Further, various aspects of the present invention provide a system for controlling a car service, including: a communication device for detecting a license-authorized terminal among terminals located in a car; and a control device or an external server for ordering initiation of the car service when no license-authorized terminals are detected by the communication device, for checking whether or not the car is halted and whether or not a car door is opened or closed, for ordering the communication device to search for the license-authorized terminal among terminals located in the car when the car is halted and the car door is opened and subsequently closed, and for maintaining the car service when no license-authorized terminals are detected.

According to the method and the system for controlling a car service, not only can a pre-existing service be maintained even when a service licensee merely indicates his or her intention to continue to use the service in order for a non-licensee to drive the car after the licensee gets out of the car, but the licensee can also be informed of events that occurred while the service licensee was not driving the car.

In addition, the method and the system are designed to simply set or unset a service even when a service license-authorized car is halted and then a driver and/or passengers are changed, whereby the service licensee can promptly take necessary measures without trouble in response to a changing situation.

According to one embodiment, when a non-licensee drives the car out of a permitted area while the car owner, that is, the service licensee, is not riding in the car, a warning is given to the licensee so that he or she can rapidly respond to the situation. For example, the car owner can prevent the car from being stolen.

In another exemplary embodiment, when a non-licensee drives the car at a speed higher than the speed limit while the car owner, that is, the service licensee, is not riding in the car, a warning is given to him or her so that he or she can rapidly respond to the situation. For example, the car owner may call the driver to prevent the occurrence of an accident attributable to speeding or drowsy driving, or can levy a penalty in connection with such speeding.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
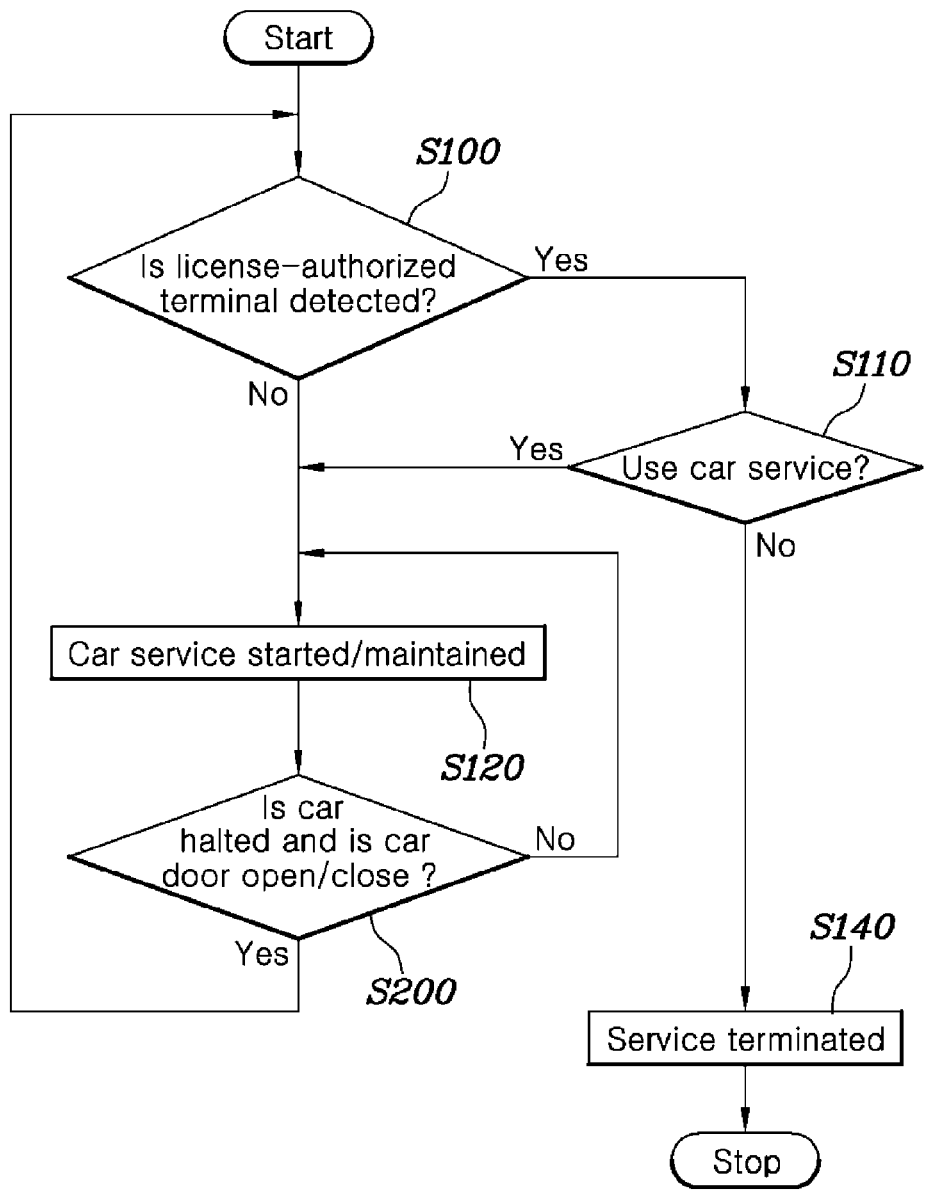
FIG. 1 is a flow chart depicting a method for controlling a car service in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Below, a description will be given of a method and a system for controlling a car service according to various embodiments of the present invention, with reference to the accompanying drawings.

Figure 2:
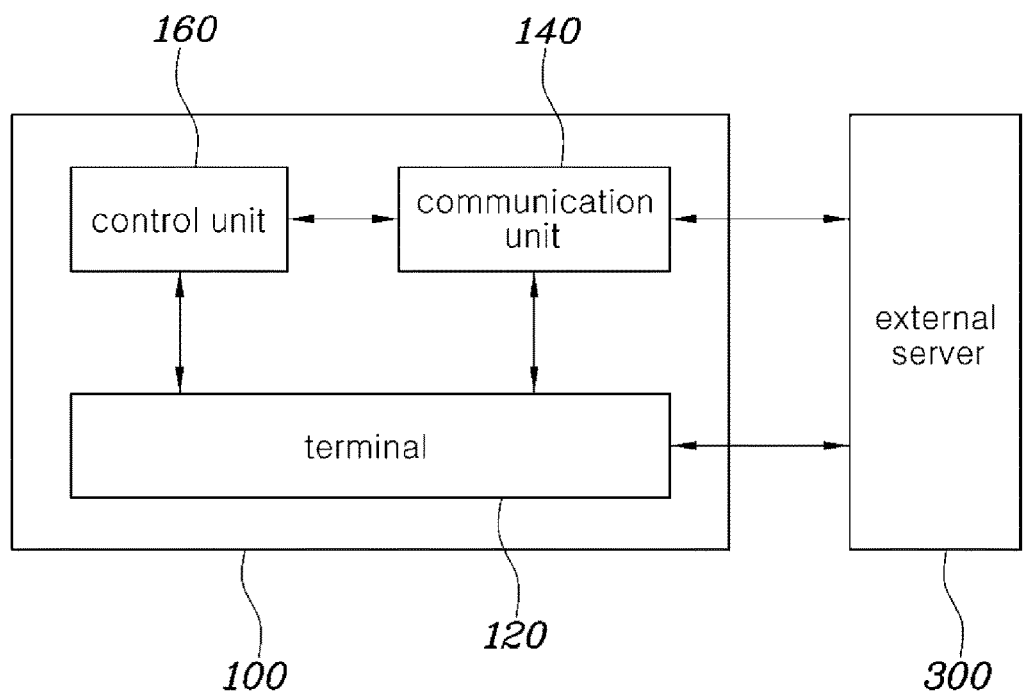
FIG. 2 is a schematic diagram depicting the organization of a system for controlling a car service in accordance with an exemplary embodiment of the present invention.

FIG. 1 is a flow chart showing a method for controlling a car service in accordance with an exemplary embodiment of the present invention. FIG. 2 is a schematic diagram showing the organization of a system for controlling a car service in accordance with an exemplary embodiment of the present invention.

With reference to FIG. 1, the method for controlling a car service in accordance with an exemplary embodiment of the present invention includes searching for a license-authorized terminal among terminals located in a car (S100); starting the car service when no license-authorized terminals are detected (S120); checking whether or not the car is halted and whether or not a car door is opened and then closed (S200); searching again for the license-authorized terminal among terminals located in the car when the car door is opened or closed (S100, S200); and maintaining the car service when no license-authorized terminals are detected (S120).

In the step of searching for a license-authorized terminal among terminals located in a car (S100), a plurality of passengers may carry respective license-authorized terminals, or there may be no terminals in the car.

In various exemplary embodiments of the present invention, the car service may be a geofence service, a speed limit alarm service, a missing child-tracking service, or a dementia or mental patient-tracking service.

According to various exemplary embodiments, the license-authorized terminal is a terminal that is granted a control right to perform or terminate the service. The control right may be granted from an external server or from the car. In addition, the term "licensee" means a possessor of the terminal granted the control right.

In the step of searching for a license-authorized terminal among the terminals located in a car, an examination is made to see whether or not a service license has been granted in connection with the car.

Here, when the car has been granted a service license, the service is applied to the car. For example, when the service is a geofence service, the car is under the control of the geofence service. When started, the car is recognized as a geofence service car and is subjected to service control by an external server.

In the step of searching for a license-authorized terminal among the terminals located in a car, the license-authorized terminal may be detected by comparing the terminals located in the car with a list provided for the car.

According to an exemplary embodiment of the present invention, the list provided for the car is intrinsic ID information of the terminals to which a service license has been granted, and may be stored in the car or the external server. The information of license-authorized terminals on the list is compared with the terminals located in the car or their intrinsic ID information to determine whether or not a terminal of interest has been granted with the service license.

In accordance with an exemplary embodiment of the present invention, when the terminal is a smart phone, the intrinsic ID information may be an MAC address.

The comparison of the terminal located in the car with the list provided for the car may be carried out by the car itself, or by the server to which information on the terminal located in the car is sent from the car.

Turning to the step of starting the car service when no license-authorized terminals are detected (S120), the car service is started when a person other than the service licensee, that is, a non-licensee, drives the car. In this regard, the non-licensee can drive the car without additional operation when the licensee merely performs a setting, or after the licensee's intention to permit the non-licensee to operate the car is detected.

When a license-authorized terminal is detected prior to the starting of the car service, the car service can start when the intention to use the service is ascertained through an interface of the terminal or the car (S110).

That is, the licensee is queried to ascertain his or her intention to use the service through the interface of the license-authorized terminal or the car.

In one embodiment, the licensee's intention to use the service can be ascertained via an SMS sent to the license-authorized terminal or using a popup window. In addition, as for the interface of the car, its application may be a head unit, on which a guide popup window is displayed or through which a guide sound is provided, to ascertain the intention to use the service. In this regard, the service licensee may permit or cancel the use of the service.

When the car escapes from a pre-established, permitted area or enters a prohibited area, the car service provides an alarm to the license-authorized terminal.

In one exemplary embodiment of the present invention, the car service may be a geofence service. In this case, when the car escapes from a permitted area or enters a prohibited area, the matter of violation is indicated via an SMS or a popup window on the license-authorized terminal. According to one embodiment, when a non-licensee drives the car out of a permitted area while the car owner, that is, the service licensee, is not driving the car, a warning is given to him or her so that he or she can rapidly respond to the situation. For example, the car owner can prevent the car from being stolen.

In accordance with one exemplary embodiment of the present invention, the car service may be a speed limit alarm service. In this case, when the car runs exceeding the speed limit that is set by the licensee, the matter of violation is informed via an SMS or a popup window on the license-authorized terminal. According to one embodiment, when a non-licensee drives the car at a speed higher than the speed limit while the car owner, that is, the service licensee, is not riding in the car, a warning is given to him or her so that he or she can rapidly respond to the situation. For example, the car owner may call the driver to prevent the occurrence of an accident attributable to speeding or drowsy driving, or may levy a penalty in connection with the speeding.

The step of checking whether or not the car is halted and whether or not a car door is opened and then closed (S200) functions to aid in a determination of whether the service licensee has exited or continues to ride in the car.

Here, the halt is determined to occur when the gear lever of the car is in P or N position and when the speed of the car is 0 km/h.

When the car door is opened and closed in the state in which the car is halted, the license-authorized terminal, among terminals located in the car, is again searched for (S100, S200). When the car is halted and a car door is opened or closed, the licensee may have exited the car, or may continue to ride therein. Accordingly, the riding or exit of the licensee is ascertained by detecting the license-authorized terminal.

In the step of maintaining the car service when no license-authorized terminals are detected (S120), the detection of no license-authorized terminals is regarded as the situation in which the service licensee has gotten out of the car.

In this step, the car service is maintained regardless of the case where a pre-existing non-licensee still remains in the car or a new non-licensee is driving the car. Thus, the car service can be maintained without additional operation even when a non-licensee drives the car after the licensee gets out of the car. Additionally, the licensee, who has gotten out of the car, is prompted to select the maintenance of the service via an SMS or an application popup window on the license-authorized terminal that he or she carries, e.g., a smart phone.

After the step of searching for the license-authorized terminal among terminals located in the car if the car is halted and the car door is opened or closed, when the license-authorized terminal is detected, an inquiry about the use of the service is made to the licensee. When the licensee's intention to stop the service is ascertained, the car service is stopped (S140).

For example, when the service licensee gets out of and gets back into the car, an inquiry about stopping the car service is given to the licensee via the license-authorized terminal, and the licensee can determine whether or not to stop the service.

In one exemplary embodiment of the present invention, the licensee's intention to stop the service may be ascertained via an SMS or an application popup window displayed on the license-authorized terminal before the service is stopped. Further, the service may be automatically stopped when the presence of the service licensee is confirmed in the step of searching for the license-authorized terminal, as predetermined by the licensee.

Turning to FIG. 2, an organization of a system for controlling a car service in accordance with an exemplary embodiment of the present invention is schematically illustrated. As shown in FIG. 2, the system for controlling a car service in accordance with an exemplary embodiment of the present invention may comprise a terminal 120, a communication device 130, a car control device 160, and an external server 300.

In one exemplary embodiment of the present invention, the terminal 120 may be a wireless communication device. Examples of the wireless communication device includes a personal computer, a Ultra Mobile PC (UMPC), a workstation, a netbook, a Personal Digital Assistant (PDA), a Portable Multimedia Player (PMP), a portable computer, a web tablet, a wireless phone, a mobile phone, a smart phone, an e-book, a smart TV, a portable game console, an electronic device connected to a computer network, and an electronic device connected to a telematics network.

The car communication device 140 functions to search for a license-authorized terminal 120 among the terminals located in a car 100. The car communication device 140 compares a list provided for the car 100 with intrinsic ID information of the terminal 120 to detect the license-authorized terminal.

According to one exemplary embodiment of the present invention, the wireless communication may be communication based on Bluetooth, WiFi, or NFC.

The control device 160 or the external server 300 orders a car service when the communication device 140 of the car 100 cannot detect a license-authorized terminal. In addition, the communication unit 140 checks whether or not the car 100 is halted and whether or not a car door is opened and then closed. When the car 100 is halted and when the car door is opened and subsequently closed, the communication device 140 again searches for a license-authorized terminal 120 among the terminals located in the car 100. When no license-authorized terminals are detected, the car service is maintained.

An exemplary embodiment of the present invention in which the car service is a geofence service, with a smart phone used as the terminal, is illustrated with reference to FIG. 1.

First, when a car is started with a person therein, a geofence server determines whether or not the car is connected with a subscription to the geofence service. The geofence service is started when the car is determined to be a subject to which the service is applicable. Then, an intrinsic ID stored in the car, such as an MAC address of a geofence service license-authorized smart phone, is compared with that of a smart phone located in the car to determine whether the smart phone located in the car is licensed for the geofence service or not.

When no geofence service license-authorized smart phones are detected, the geofence service is started.

When a geofence service license-authorized smart phone is detected, an inquiry about the use of service is made via an SMS or an application popup window displayed on the smart phone. Optionally, a head unit may be used to display a guide popup window or to provide a guidance voice message inquiring about the use of the service.

When the licensee accepts the use of the service, the geofence service is started. On the other hand, when the licensee refuses the use of the service, the geofence service is stopped because an alarm is unnecessary in the condition where the licensee drives the car.

When the licensee gets out of the car after some travel, a person other than the licensee may drive the car. In this regard, if the car is halted, with the subsequent opening and closing of a car door, search is made for a geofence service license-authorized smart phone.

When no service license-authorized smart phones are detected, with the licensee having exited the car, the geofence service is maintained. Here, the service may automatically continue without additional operation when the service licensee gets out of the car. Alternatively, the service licensee, having exited the car, may receive an SMS or application popup window on his or her smart phone to determine whether or not the service is to be maintained.

When the geofence service licensee again gets into the car, he or she may be prompted to indicate his or her intention to maintain or stop the service through an SMS or application popup window displayed on the smart phone or a guide popup or voice message provided from a head unit.

When a non-licensee drives the car out of a permitted area or into a prohibited area after the licensee gets out of the car, a warning is sent to the smart phone of the licensee.

Accordingly, the use of service can be promptly determined even when a driver is replaced with another, whereby the licensee can utilize the service without hassle.

As described hitherto, the method and the system for controlling a car service in accordance with the present invention are designed to simply set or unset a service even when a service license-authorized car is halted and then a driver and/or passengers are changed, whereby the service licensee can promptly take necessary measures without trouble in response to a changing situation.

According to one embodiment, when a non-licensee drives the car out of a permitted area while the car owner, that is, the service licensee, is not riding in the car, a warning is given to the licensee so that he or she can rapidly respond to the situation. For example, the car owner can prevent the car from being stolen.

In another exemplary embodiment, when a non-licensee drives the car at a speed higher than the speed limit while the car owner, that is, the service licensee, is not riding in the car, a warning is given to him or her so that he or she can rapidly respond to the situation. For example, the car owner may call the driver to prevent the occurrence of an accident attributable to speeding or drowsy driving, or can levy a penalty in connection with such speeding.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a vehicle service, comprising:
    searching, by a communication device, for a license-authorized terminal among terminals located in a vehicle;
    starting, by a control device or an external server, the vehicle service when no license-authorized terminals are detected;
    checking, by the control device, whether or not the vehicle is halted and whether or not a vehicle door is opened and subsequently closed;
    searching, by the communication device, again for the license-authorized terminal among the terminals located in the vehicle when the vehicle door is opened and subsequently closed; and
    maintaining, by the control device or an external server, the vehicle service when no license-authorized terminals are detected.

2. The method of claim 1, wherein an examination is made to see whether or not the vehicle is granted a service license in the step of searching for the license-authorized terminal among the terminals located in the vehicle.

3. The method of claim 1, wherein the license-authorized terminal is detected by comparing the terminals located in the vehicle with a list provided for the vehicle in the step of searching for the license-authorized terminal among the terminals located in the vehicle.

4. The method of claim 1, wherein the step of starting the vehicle service is conducted when an intention of a licensee to use the vehicle service is checked through the license-authorized terminal after the license-authorized terminal is detected.

5. The method of claim 1, wherein the step of starting the vehicle service is conducted when an intention of a licensee to use the vehicle service is checked through an interface of the vehicle after the license-authorized terminal is detected.

6. The method of claim 1, wherein the step of checking whether or not the vehicle is halted is carried out by determining whether or not a gear lever is in a P or N position while the vehicle is moving at a speed of 0 km.

7. The method of claim 1, further including stopping, by the control device or an external server, the vehicle service when the license-authorized terminal is detected after the step of searching for the license-authorized terminal among the terminals located in the vehicle when the vehicle is halted and the vehicle door is opened or closed.

8. The method of claim 7, wherein the step of stopping the vehicle service is carried out when an intention of a licensee to stop the service is checked after the license-authorized terminal is detected.

9. The method of claim 1, wherein the vehicle service provides an alarm when the vehicle escapes from a pre-established permitted area or enters a pre-established prohibited area.

10. The method of claim 1, wherein the vehicle service sends an alarm to the license-authorized terminal when the vehicle runs more than a predetermined speed.

11. A system for controlling a vehicle service, comprising:
a communication device for detecting a license-authorized terminal among terminals located in a vehicle; and
a control device or an external server for ordering initiation of the vehicle service when no license-authorized terminals are detected by the communication device, for checking whether or not the vehicle is halted and whether or not a vehicle door is opened or closed, for ordering the communication device to search for the license-authorized terminal among terminals located in the vehicle when the vehicle is halted and the vehicle door is opened and subsequently closed, and for maintaining the vehicle service when no license-authorized terminals are detected.

* * * * *